United States Patent [19]

Laing et al.

[11] 3,838,232

[45] Sept. 24, 1974

[54] MOUNTING FOR TELEPHONE DIALS

[75] Inventors: Graham Sterling Laing; Ronald Joseh Morrell; Bev William Gumb, all of London, Ontario, Canada

[73] Assignees: Bell-Northern Research Ltd., Ottawa, Ontario, ; by said Laing; Northern Electric Company Limited, Montreal, Quebec, both of, Canada; by said Morrell and Gumb

[22] Filed: May 9, 1973

[21] Appl. No.: 358,494

[52] U.S. Cl. .............................................. 179/178
[51] Int. Cl. .......................................... H04m 1/02
[58] Field of Search........... 179/178, 100 R, 100 D, 179/179

[56] References Cited

UNITED STATES PATENTS 3,126,454 3/1964 Fresk et al. .................... 179/100 D

*Primary Examiner*—Thomas W. Brown
*Attorney, Agent, or Firm*—Sidney T. Jelly

[57] ABSTRACT

A telephone dial is quickly and easily mounted in a housing by brackets which clip into supports forming part of the housing. The brackets are assembled to the dial before mounting — permitting easier assembly and closer positioning of items in the housing. The dial is readily removed for servicing or replacement. As a further feature the brackets form an opposed pair and by changing over assembly positions, dials of different widths can be accommodated.

7 Claims, 7 Drawing Figures

MOUNTING FOR TELEPHONE DIALS

This invention relates to the mounting of telephone dials in telephone sets, and in particular to the mounting of dial assemblies in the telephone set.

For servicing it is often necessary to remove and replace the dial, both for servicing and replacing the dial and to obtain access to components positioned beneath the dial. Normally removal and replacement is by unfastening and refastening the dial to mounting brackets – if access to the attachment screws is possible – or by removing screws to permit removal of the mounting brackets. It is often difficult to provide good access to the bracket mounting or fastening screws. Considerable difficulties can also arise in the original assembly of the dial to the telephone set—again because of difficulty in obtaining access to attachment screws.

The present invention provides for very quick and simple insertion and removal of the complete assembly of dial and mounting brackets, avoiding the use of screws for attaching the brackets to the telephone set housing.

Further, it is possible to provide either rotary or pushbutton dials for telephone sets, but the structure of the dials differs and it is not normally possible to use the same mountings for both dials. For example the attachment points on a rotary dial are usually wider apart than on a pushbutton dial. Furthermore the height of the attachment points may differ relative to a common datum. As a result it is usual to provide alternative forms of mounting brackets for the two alternative dial forms. A feature of the present invention provides mounting brackets which, by alternative positioning in the telephone set, can be used to mount either of the dials.

Broadly, the present invention provides a mounting for a telephone dial comprising a pair of mounting brackets, and attachment means for each bracket, each attachment means comprising an anchorage position for retention of a projection on one end of a bracket and a resilient support and retaining member for retention of the other end of a bracket, with guide and support means extending between the anchorage and the support and retaining member for acceptance of one edge of the bracket.

In accordance with a feature of the invention, the brackets form an opposed pair having offset mounting positions for attachment to a dial, such that in one related opposed position mounting for one form of dial is provided, while in another related opposed position mounting for an alternative form of dial is provided.

The invention will be readily understood by the following description of one embodiment, by way of example, in conjunction with the accompanying drawings, in which.

Figure 1:
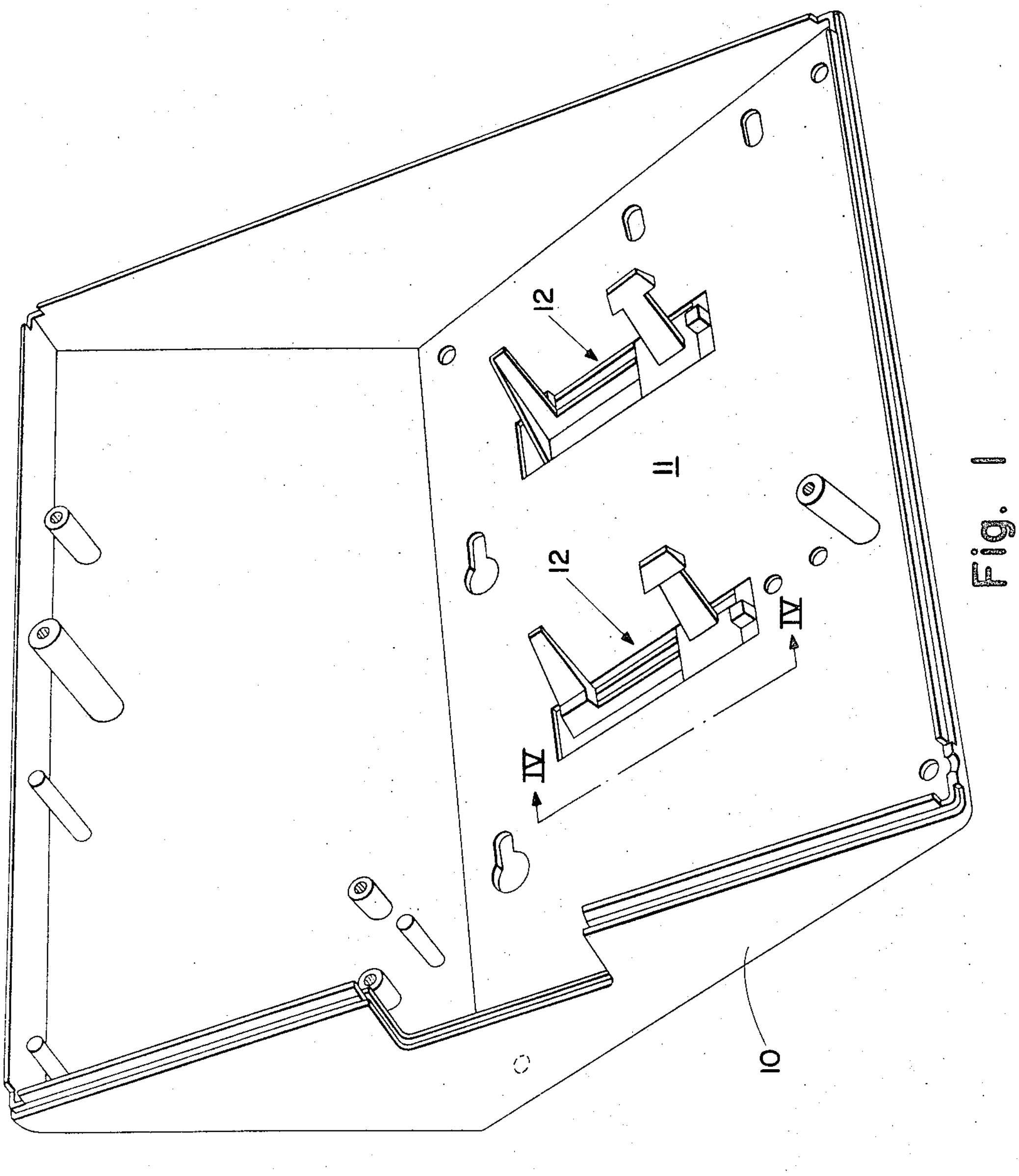
FIG. 1 is a perspective view of a bottom housing of a telephone set showing the attachments for the dial mounting brackets.

Illustrated in FIG. 1 is the base or bottom housing 10 of a telephone set. In the particular example housing 10 is molded of plastics material and molded integrally with the bottom surface 11 are two bracket supports and mountings 12. The form of the brackets 12 is seen more clearly in FIGS. 2, 3 and 4. Each bracket comprises a locating member and anchorage 13, a support and retaining member 14, and guide and support means 15 extending between anchorage 13 and retaining member 16. The mountings 12 are formed as an opposed pair, as illustrated in FIG. 1.

The locating member and anchorage 13 comprises a fairly rigid locating portion 17 which extends upwardly, normal to the bottom surface 11, and inclined slightly toward the retaining member 14. The rigidity of the locating portion is enhanced by a web 18 on the rear surface of the locating portion. At the base of the locating portion 17 is a stop 19. Stop 19 locates one end of a bracket as will be described. In the example illustrated, the guide and support means 15 is an extension of the locating member and anchorage 13, comprising two parallel ribs 20, spaced apart to define a channel 21 which is slightly wider than the thickness of a bracket. The channel 21 continues rearward, as seen in the drawings, into the stop 19 to form an enclosed recess or anchorage 22. As described later, the anchorage 22 receives an extension on a bracket. The support and retaining member 14 is aligned with the locating member 13 and the guide and support means 15 and is in the form of a resilient web 23 extending normal to the bottom surface 11 and may also be inclined slightly away from the locating member 13. The web is positioned so that it has one face 24 in the same plane as face 25 on the locating portion 17, this plane also common to a side face 26 of the channel 21. When a bracket is in position one surface of the bracket is coincident with this plane. At the upper end of the web 23 is an enlargement 27 which extends from the face 24. The upper surface 28 of the enlargement 27 is inclined downwards, as illustrated. The bottom surface 29 of enlargement 27 is normal to the face 24. A further stop 30 is formed at the base of the retaining member 14 on the side remote from the locating member 13. As stated above, mountings 12 are an opposed pair, in the form reversed for one bracket relative to the other.

Figure 2:
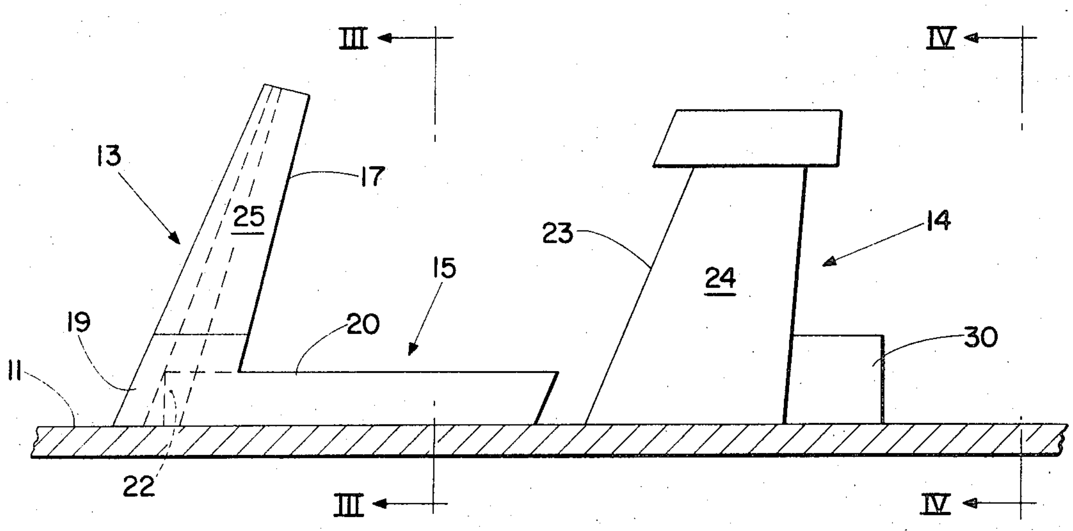
FIG. 2 is a side view of one bracket support and mounting.
Figure 3:
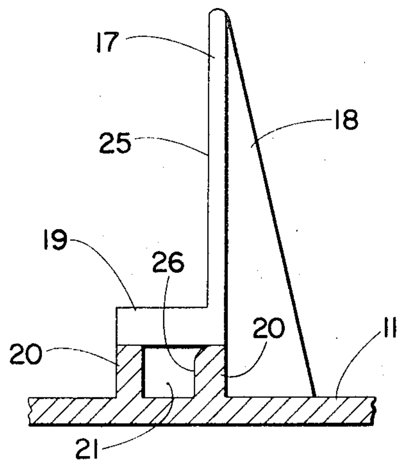
FIG. 3 is a cross-section on the line III—III of FIG. 2.
Figure 4:
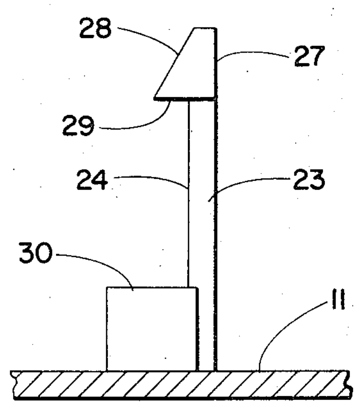
FIG. 4 is a cross-section on the line IV—IV of FIG. 2.
Figure 5:
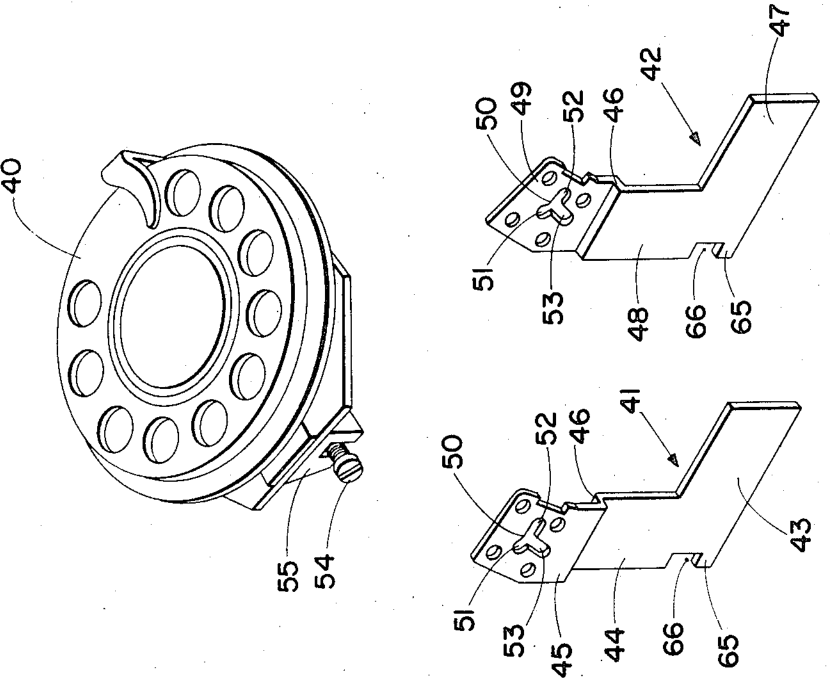
FIG. 5 is a perspective view of a pair of mounting brackets, in one opposed position, with the related dial spaced therefrom.

FIG. 5 illustrates a rotary dial 40, which is mounted in the telephone set by a pair of brackets 41 and 42 adapted for mounting in the mountings 12 of FIGS. 1, 2 and 3. The brackets 41 and 42 are a pair in that they are of opposite hand. Thus, as seen in FIG. 5, bracket 41 is formed from an L-shaped piece of metal sheet or plate with a base leg 43 and an upward extending leg 49. Leg 44 has a portion 45 which is displaced from the plane of the main part of the leg, by a double or cranked bend 46. The plane of the portion 45 is parallel to but displaced from the plane of the main part of leg 44. Bracket 42 is of similar construction, with a base leg 47, and upward extending leg 48. Leg 48 has a portion 49 the plane of which is parallel to but displaced from the plane of the main part of leg 42. In the arrangement of FIG. 5, for supporting a rotary dial, the brackets 41 and 42 are mounted so that the portions 45 and 49 are displaced in a direction away from each other—to give a spacing which is wider than that between the main parts of legs 44 and 48. Formed in the portions 45 and 49 are apertures 50. Each aperture 50 has a relatively large radius portion 51 and two extensions 52 and 53 of rather smaller radius. The large radius portion 51 is such that the head of screw 54 in the attachment bracket 55 of rotary dial 40 will pass through this portion. The dial is then moved so that the shank of the screw 54 enters one or the other of the extensions 52 and 53. For a rotary dial the screw is positioned in the extension 52.

Figure 6:
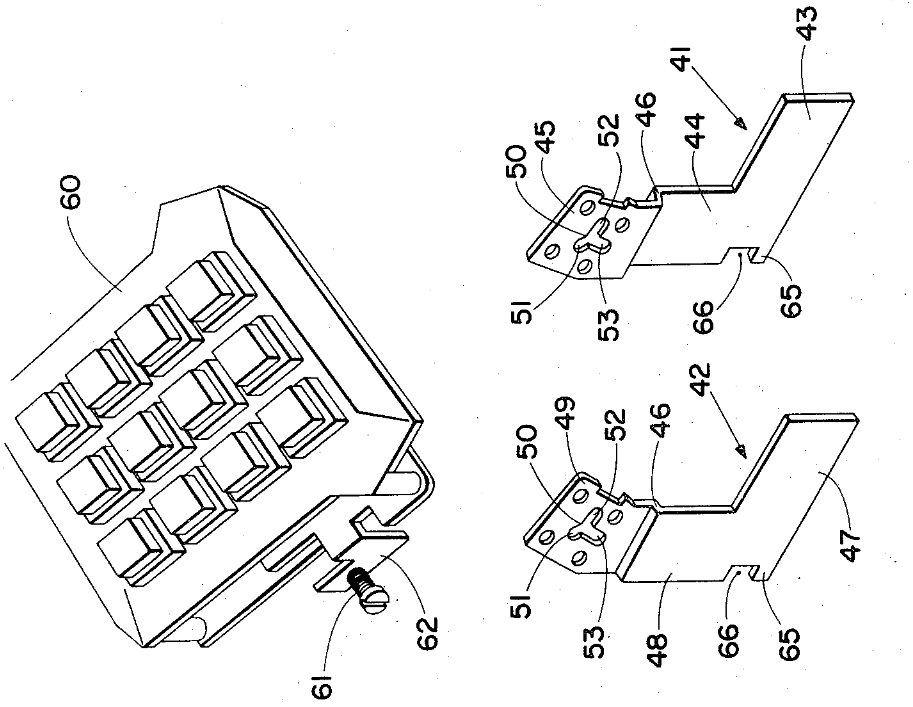
FIG. 6 is a perspective view of a pair of mounting brackets of FIG. 2 in the alternative opposed position, with the alternative dial form spaced therefrom.

For mounting a pushbutton dial, as illustrated in FIG. 6, the brackets 41 and 42 are reversed so that the portions 45 and 49 are displaced in a direction toward each other, giving a spacing which is less than that between the main parts of legs 44 and 48. To mount the pushbutton dial 60, the heads of screws 61 in attachment brackets 62 are passed through a large radius portion 51 of the apertures 50, and then the dial is moved so that the shanks of the screws enter the extension 53.

The brackets 41 and 42 can be inserted in the bracket support and mountings 12 prior to attachment to the particular dial to be installed. However, by assembly of dial and brackets as a unit, the easy mounting facility of the bracket mounting 12 is utilized to maximum benefit. Assembly of the dial itself is a separate operation, and attachment of the brackets 41 and 42 can be made part of that operation. The whole unit can then be "snapped in." If a dial is to be replaced in service, either with a dial of the same type or with a different type of dial, an assembly of dial and brackets can be installed, or the brackets from the removed dial are transferred to the new dial, the particular installation of the brackets depending upon the type of dial.

Figure 7:
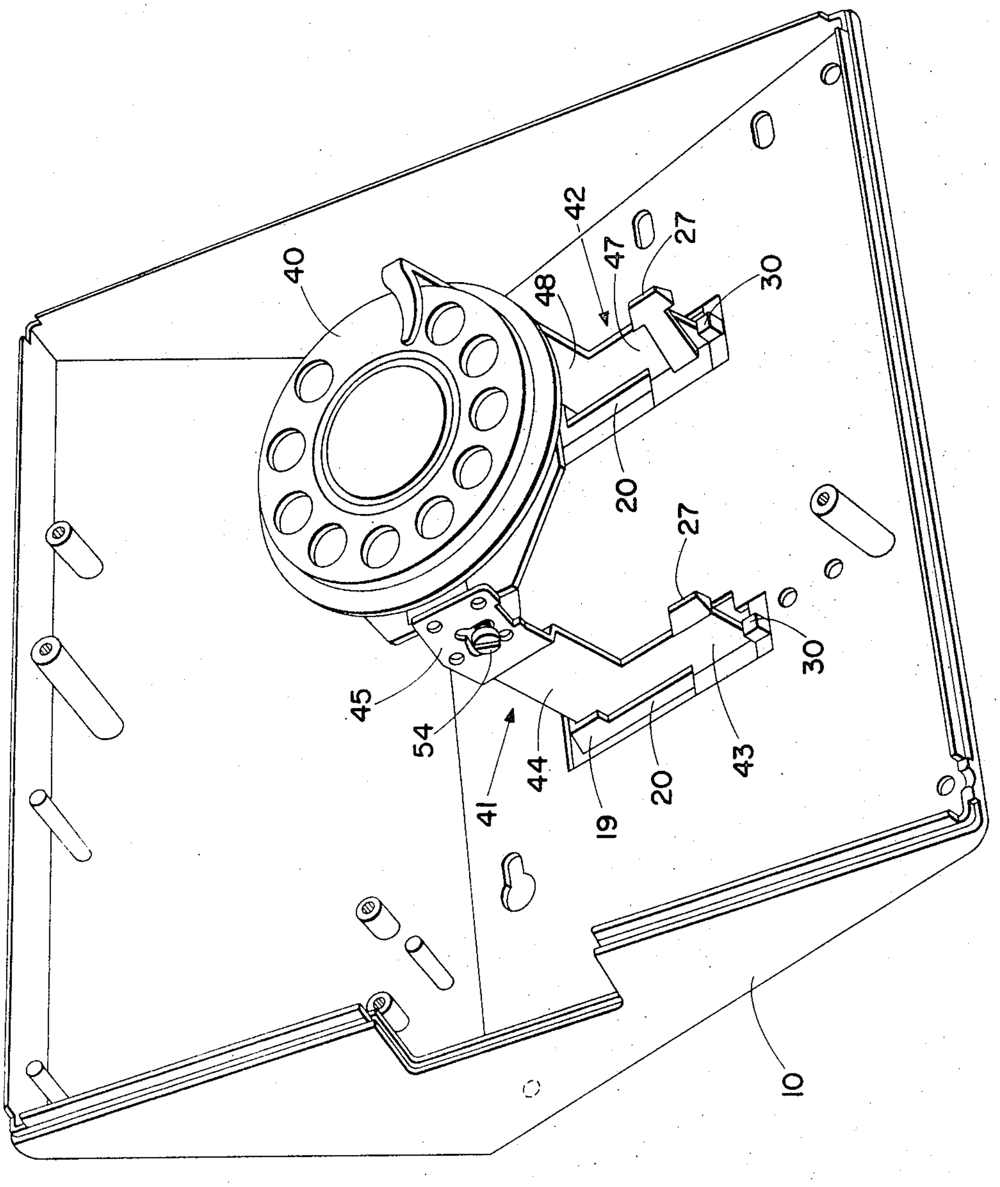
FIG. 7 is a perspective view similar to that of FIG. 1, showing a dial assembly in a housing.

Assuming brackets have been attached to a dial, installation of the assembly is as follows. When a roatary dial is to be fitted, brackets 41 and 42 are attached to the rotary dial as illustrated in FIG. 5. The assembly is then held—for example by gripping the assembly with the dial between the thumb and first finger and facing the palm. The back corners of the base legs 43 and 47 are positioned in the channels 21 of the mountings 12. Each back corner is formed to provide an extension 65 by the cutting of a notch 66. The back corners are slid rearwardly along the channels 21 until the extensions 65 enter the recesses or anchorages 22. The assembly is then pivotted downwardly the legs 44 and 48 in contact with the faces 25 of the locating portions 17. The forward ends of legs 43 and 47 move down the inclined surfaces 28, and the webs 23 deflect. Continued movement of the assembly causes the front ends of the legs 43 and 47 to clip under the enlargements 27, being in contact with the under surfaces 29. The legs are also in contact with the faces 24. Each bracket is held firmly in place, positioned by the channels 21 and held and located by the extensions 65 in the recesses or anchorages 21 and by the enlargements 27 of the locating members 14. Stops 30 prevent forward movement of the brackets. A rotary dial is illustrated installed in FIG. 7.

The assembly is easily removed. The dial and bracket assembly is gripped with one hand and thumb and first finger of the other hand squeeze the locating members 14 towards each other—deflecting resilient webs 23 and moving the enlargements 27 out of engagement with the brackets 41 and 42. The assembly is then pivotted upwards and moved forwards to disengage the extensions 65 from the recesses or anchorages 21. The assembly is then lifted free—restrained only by the electrical connections of the dial.

For a pushbutton dial the installation and removal, is the same as for the rotary dial, the brackets merely being assembled to the dial in the appropriate reversed position.

It will be appreciated that mounting of other forms of dials, differing from those described, can also be provided by suitable adaption of the brackets at the position of attachment to the dial. Further, the attachment or mounting of the brackets in the housing can be used for the installation of assemblies or units other than dials.

What is claimed is:

1. A mounting for a telephone dial in a telephone housing, comprising:

a pair of mounting brackets attached to the dial, one on each side thereof; and attachment means on a base surface of said housing, an attachment means for each bracket, each attachment means comprising:

a locating and anchoring member;

a resilient support and retaining member;

guide means extending between said locating and anchoring member and said support and retaining member;

said locating and anchoring member comprising: a stop portion; a recess in said stop portion and a locating portion extending from said stop portion in a direction away from said base surface of said housing;

said resilient support and retaining member comprising: a stop; a resilient web extending from said base surface of said housing; and a retaining portion at an end of said resilient web remote from said base surface;

said guide means comprising a pair of ribs spaced apart and substantially parallel to define a channel to receive a base portion of one of said brackets, the channel extending from said stop portion of said locating and anchoring member toward said resilient support and retaining member;

an extension on a bottom edge of each of said brackets, said extensions positioned in said recess in said locating and anchoring member, and a leg portion on each bracket positioning against said resilient web and under said retaining portion of said support and retaining member.

2. A mounting as claimed in claim 1; said locating portion of said locating and anchoring member including a face extending from said stop portion; said resilient web of said support and retaining member including a face extending in a common plane with said face of said locating portion; said common plane in substantial alignment with one edge of said channel in said guide means, the other edge of said channel spaced from said commc^n plane, the arrangement such that one surface of a bracket is in contact with said faces and said one edge of said channel when said bracket is in position.

3. A mounting as claimed in claim 2, said retaining portion at said end of said resilient web comprising an enlargement extending laterally beyond said face at said web and having a lower surface in engagement with a surface on said leg portion of a bracket and an upper surface inclined downwardly and outwardly to intercept said lower surface.

4. A mounting as claimed in claim 2, said ribs of said guide means extending the full distance between said locating and anchoring member and said support and retaining member.

5. A mounting as claimed in claim 1, each bracket comprising an L-shaped sheet of material including a base leg and an upward extending leg, said base leg positioned with a base portion in a channel in one of said guide means, said upward extending leg extending from a forward end of said base leg, said extension formed in the forward end of said base leg, the forward end of said base leg in contact with said stop portion, a rearward end of said base leg in contact with said stop, one face of said bracket in contact with a face on said locating portion, a face on said resilient web and a face on one web, the face on the web facing toward said channel, and said faces substantially on a common plane, and dial attachment means at an upper end of said upwardly extending leg, said attachment means comprising at least one aperture and a fixing member extending through said aperture into said dial.

6. A mounting as claimed in claim 5; the two brackets an opposed pair, a cranked portion at said upper end of each upwardly extending leg, said cranked portion extending in a plane substantially parallel to and spaced from said common plane, said cranked portion in one bracket displaced from said common plane in a direction opposite to the displacement of the cranked portion of the other bracket.

7. A mounting as claimed in claim 6, said aperture at said upper end of said upwardly extending leg comprising a common larger radius portion and two smaller radius portions extending from the larger radius portion, the arrangement such that a head of a fixing member can be inserted through said larger radius portion, said fixing member moved to position a shank in one of said smaller radius portions.

* * * * *